United States Patent
Murphy et al.

(10) Patent No.: US 6,366,722 B1
(45) Date of Patent: Apr. 2, 2002

(54) OPTICAL WAVEGUIDE SENSORS HAVING HIGH REFRACTIVE INDEX SENSITIVITY

(75) Inventors: Kent A. Murphy, Troutville; Mark E. Jones, Blacksburg, both of VA (US)

(73) Assignee: Luna Innovations, Inc., Blacksburgs, VA (US)

( * ) Notice: Subject to any disclaimer, the term of this patent is extended or adjusted under 35 U.S.C. 154(b) by 0 days.

(21) Appl. No.: 09/893,182

(22) Filed: Jun. 26, 2001

Related U.S. Application Data

(63) Continuation-in-part of application No. 09/262,567, filed on Mar. 4, 1999.

(51) Int. Cl.⁷ ............................................. G02B 6/34
(52) U.S. Cl. .............................. 385/37; 385/38; 385/9; 385/12
(58) Field of Search ............................... 385/37, 38, 9, 385/10, 12, 14, 41, 39, 140, 145; 359/127, 130, 131

(56) References Cited

U.S. PATENT DOCUMENTS

| | | | | |
|---|---|---|---|---|
| 4,006,962 A | * | 2/1977 | Olshansky | 350/96 |
| 4,750,796 A | * | 6/1988 | Shibata et al. | 350/96.29 |
| 4,828,359 A | * | 5/1989 | Ueba et al. | 350/96.34 |
| 5,044,723 A | * | 9/1991 | MacDonald | 385/12 |
| 5,048,913 A | | 9/1991 | Glenn et al. | |
| 5,091,983 A | * | 2/1992 | Lukosz | 385/13 |
| 5,124,543 A | * | 6/1992 | Kawashima | 250/208.1 |
| 5,430,817 A | | 7/1995 | Vengsarkar | |
| 5,641,956 A | | 6/1997 | Vengsarkar et al. | |
| 5,802,236 A | | 9/1998 | DiGiovanni et al. | |
| 5,864,641 A | | 1/1999 | Murphy et al. | |
| 5,903,685 A | * | 5/1999 | Jones et al. | 385/12 |
| 6,014,488 A | | 1/2000 | Shustack | |
| 6,021,240 A | | 2/2000 | Murphy et al. | |
| 6,035,082 A | | 3/2000 | Murphy et al. | |

OTHER PUBLICATIONS

V. Bhatia et al., "Optical Fiber Long–Period Grating Sensors," *Lightnews*, Winter 1995, pp. 6–11, U.S.A.

A. M. Vengsarkar et al., "Long–Period Fiber Gratings as Band Rejection Filters," *Journal of Lightwave Technology*, Jan. 1996, pp. 58–65, vol. 14, No. 1.

A. M. Vengsarkar et al., "Long–Period Fiber Gratings as Gain–Flattening and Laser Stabilizing Devices," *Tenth International Conference on Integrated Optics Fiber Communication*, vol. 5, Jun. 26–30, 1995, pp. 3–4.

A. M. Vengsarkar et al., "Long–Period Cladding–Mode–Coupled Fiber Gratings: Properties and Applications," *1995 Technical Digest Series*, vol. 22, Sep. 9–11, 1995, pp. SaB2-1—SaB2-4.

A.M. Vengsakar et al., "Long–Period Gratings as Band-Rejection Filters," *OFC'95 Postdeadline Papers*, Feb. 26–Mar. 3, 1995, pp. PD4-1—PD4-5.

T.A. Tran et al., "Real–Time Immunoassays Using Fiber–Optic Long–Period Grating Sensors," *Biomedical Sensing, Imaging, and Tracking Technologies I*, SPIE Proceedings, vol. 2676, Jan. 29–31, 1996, pp. 165–170.

\* cited by examiner

Primary Examiner—Mohammad Sikder
(74) *Attorney, Agent, or Firm*—Joy L. Bryant

(57) ABSTRACT

An optical waveguide sensor having high refractive index sensitivity over a range of ambient refractive indices is provided. The sensor comprises a core having at least one long period gating disposed therein. An inner and outer cladding region, each cladding region having an effective refractive index. The total effective refractive index of the inner cladding region and the outer cladding region is approximately equal to but not greater than the effective refractive index of an environmental parameter to be sensed. These optical waveguide sensors are useful for measuring changes in a variety of environmental parameters.

45 Claims, 3 Drawing Sheets

OPTICAL WAVEGUIDE SENSORS HAVING HIGH REFRACTIVE INDEX SENSITIVITY

CROSS-REFERENCE TO RELATED APPLICATIONS

This application is a continuation-in-part of copending U.S. patent application Ser. No. 09/262,567, entitled "Optical Waveguide Sensors Having High Refractive Index Sensitivity," filed Mar. 4, 1999 and which is hereby incorporated by reference in its entirety.

FIELD OF THE INVENTION

The present invention relates to optical waveguide sensors. In particular, it relates to optical waveguide sensors having first and second cladding regions, each cladding region having an effective refractive index such that the total effective refractive index of the two cladding regions is approximately equal to but not greater than the environmental refractive index to be sensed.

BACKGROUND OF THE INVENTION

Optical waveguide sensors are finding increased applications in civil, industrial, and military fields where enhanced sensitivity, geometrical flexibility, miniaturization, immunity from electromagnetic interference and multiplexing capabilities are desirable. Some of these sensors are fabricated by exposing an optical waveguide to a pattern of light at a wavelength at which the waveguide is photosensitive. The light pattern photoinduces a refractive index variation or grating with the same spatial profile as the light pattern. Long period gratings have periods (10–1500 microns) that are greater than the operating light source wavelength. In use, long period gratings convert light traveling in the forward-propagating guided mode of the waveguide to forward-propagating, non-guided lossy cladding modes of the waveguide.

Vengsarkar (U.S. Pat. No. 5,430,817) first proposed the use of long period gratings for optical fiber communication systems and in optical fiber sensing systems. The sensing system comprised a source of optical energy and a length of optical fiber that included both a short period reflective sensing grating for reflecting light and a long period grating coupled to the fiber for receiving light reflected from the short period grating. A photodetector was used for detecting the intensity of the light through the device.

Later, Vengsarkar et al. (U.S. Pat. No. 5,641,956) proposed an optical waveguide sensor arrangement that did not require the use of a short period or Bragg grating. This arrangement comprised an optical waveguide sensor having guided modes, lossy non-guided modes, and a long period grating coupling the guided modes to the lossy non-guided modes. The long period grating produces a wavelength transmission spectrum functionally dependent on the physical parameter sensed. In turn, this optical sensor arrangement is useful for measuring temperature, strain, shape, refractive index and corrosion. However, this type of arrangement has its limitations in that the maximum refractive index sensitivity can only be obtained in the refractive index range approximately equal to that of the fiber cladding glass used or an index near and below 1.44. When highly sensitive measurements are necessary, such as measurements with respect to biological samples, which have a refractive index approximately equal to 1.33, these sensors fail to produce a notable change in the coupled wavelength because the refractive index of 1.33 is not approximately equal to and below 1.44, for example 1.43. Rather, in order to use this type sensor, one would have to alter the environmental refractive index by seeding the environment with titanium or some other high refractive index particles. Thus, the need exists to have an optical sensor which has a high refractive index sensitivity and operates in a refractive index range from about 1.1 to about 3.0.

DiGiovanni et al. (U.S. Pat. No. 5,802,236) describe a microstructured optical fiber that has a solid silica core region surrounded by an inner cladding region and an outer cladding region. The inner cladding region has larger ratio of void to glass than the outer cladding region. Consequently, the inner cladding region has a lower effective refractive index than the outer cladding region, and both cladding regions have a lower effective refractive index than the core region. The effective refractive index of a feature of a fiber is defined as the value of the refractive index of the feature that gives, in a simulation of the fiber, the same optical properties as the actual fiber. Roughly speaking, the effective refractive index of a non-homogeneous material can be considered to be a weighted average of the refractive indices of the constituents of the material. However, when considering the total effective refractive index of the cladding of an optical fiber, one must sum each individual effective refractive index for each cladding. In so doing, the total effective refractive index of the microstructured fiber disclosed by DiGiovanni et al. is driven by light propagation parameters and is arbitrary with respect to the environment.

Some have tried to fulfill the need for high refractive index sensitivity at lower ambient refractive indices by coupling light into higher order modes. These modes have a larger evanescent field outside the fiber so changes in the external refractive index have a greater influence on the effective index of the coupled cladding mode. As a result, a larger wavelength shift has been obtained with higher-order modes when compared to lower order modes. However, coupling into higher-order modes has limitations. First, coupling into higher order modes depends on the modal overlap between the fundamental mode and the cladding mode. Each mode has an energy distribution and for modal coupling to occur, there must be an overlap of this energy distribution. For higher order modes, this overlap with the fundamental mode is reduced. Therefore, to couple light into these modes, better coupling conditions are required which are sometimes difficult to obtain. Furthermore, coupling into higher-order modes does not necessarily increase sensitivity beyond certain higher order modes.

One method to increase long period grating sensitivity is to couple light into a cladding mode near where the group index of the core equals the group index of the cladding. At this point, the slope of the long period grating characteristic curve is infinite which corresponds to maximum long period grating sensitivity with respect to the refractive index. However, operating at or near this point causes a broadening of the long period grating spectral peak which reduces the sensitivity one is trying to obtain. The response of the long period grating is also non-linear and is dependent upon the effective refractive index of the cladding. Moreover, this non-linear response is asymptotic at the effective refractive index of the cladding. Since fused silica glass is often used in fiber, the refractive index is near 1.44 and thus high sensitivity can only be obtained when sensing refractive index changes around 1.44.

Lastly, many sensors employing long period gratings use standard step index fibers or other radially symmetric fibers. Thus, the coupling from the fundamental mode to cladding modes can be determined through finite element method (FEM) models or by other means of solving the wave equation. Therefore, it is easy to determine long period grating characteristics and how the environment acts to change long period grating coupling conditions. When there is no longer a radially symmetric cladding, perturbations in the cladding make it difficult to predict how the evanescent field will interact with the environment.

An object of the present invention is to provide an optical waveguide sensor having an inner and an outer cladding region, each cladding region having an effective refractive index such that the total effective refractive index of the combined cladding regions is approximately equal to but not greater than the effective refractive index of a particular environment to be sensed.

Another object of the present invention is to provide an optical waveguide sensor having a total effective refractive index of the cladding regions ranging from about 1.1 to about 3.0.

Another object of the present invention is to provide an optical waveguide sensor which is prepared from a microstructured optical fiber that has a total effective refractive index approximately equal to but not greater than the effective refractive index of a particular environment to be sensed.

Another object of the present invention is to provide a process for measuring changes in an environmental parameter which employs an optical waveguide sensor having first and second cladding regions such that the total effective refractive index of the cladding regions is approximately equal to but not greater than the effective refractive index of the environmental parameter to be sensed.

SUMMARY OF THE INVENTION

By the present invention, an optical waveguide sensor is presented that exhibits a high sensitivity over a range of ambient refractive indices. This waveguide is useful for highly sensitive applications such as the testing of biological materials. In its simplest configuration, the optical waveguide has a core having at least one long period grating disposed therein. Each long period grating has a plurality of index perturbations spaced apart by a periodic distance $\Lambda$, wherein the periodic distance is $10\ \mu m \leq \Lambda \leq 1500\ \mu m$. An inner cladding region surrounds the core. The inner cladding region has a plurality of spaced apart first cladding features. These features are disposed within a first cladding material. The resulting inner cladding region has an effective refractive index. The waveguide also comprises an outer cladding region which surrounds the inner cladding region. The outer cladding region has a plurality of spaced apart second cladding features. These second cladding features are disposed within a second cladding material. The resulting outer cladding region has an effective refractive index. The total effective refractive index of the inner cladding region and the outer cladding region is approximately equal to but not greater than the effective refractive index of an environmental parameter to be sensed.

The optical waveguide sensor is coupled to a source means for providing light to the optical waveguide sensor. An optoelectronic detector is positioned in an operable relationship to the optical waveguide sensor and detects light transmitted through the optical waveguide sensor.

In use, this sensor is employed to measure changes in an environmental parameter. This is accomplished by providing the optical waveguide sensor, exposing the sensor to an environmental parameter, and measuring a change in the long period grating coupling conditions.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
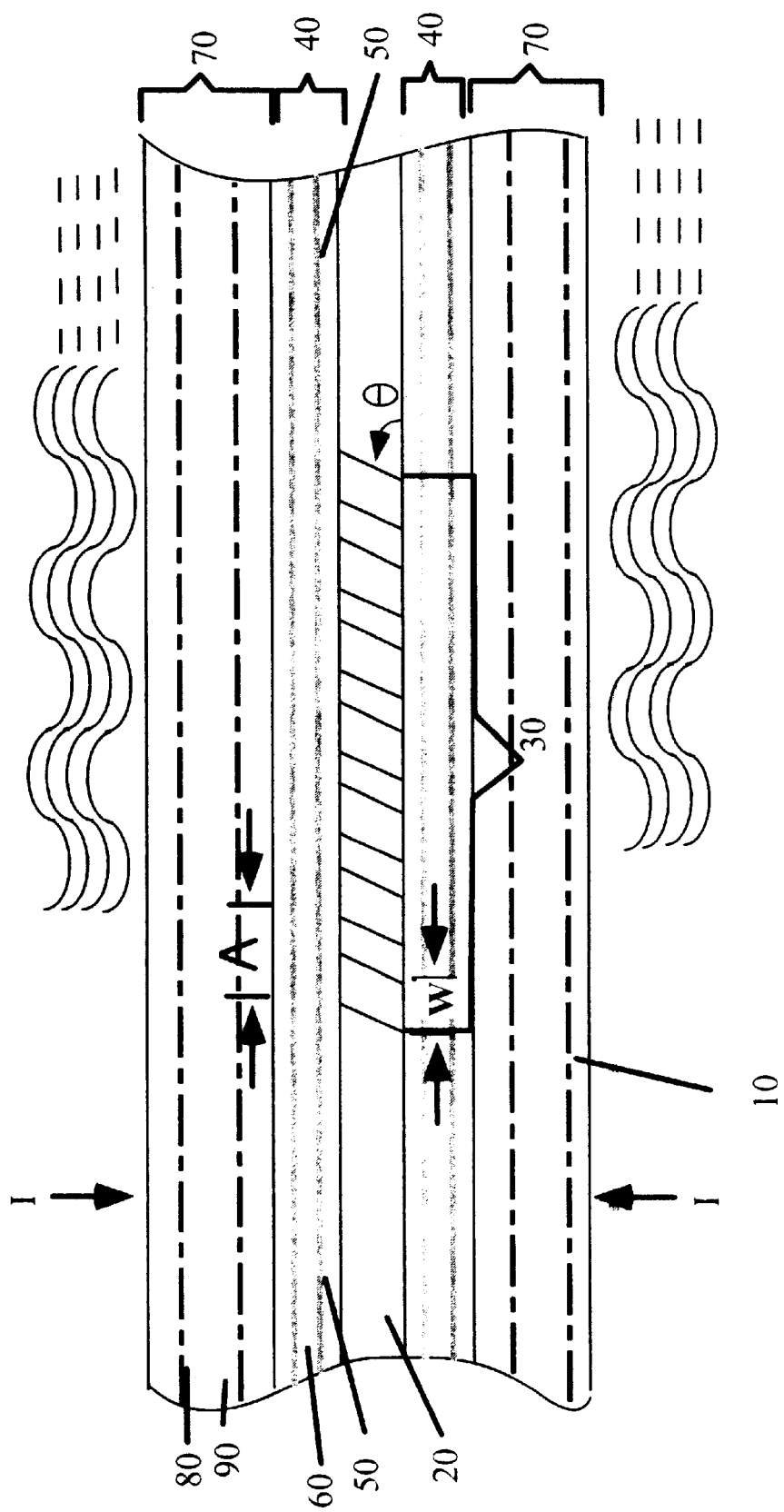
FIG. 1 is a longitudinal cross-sectional view of a fiber optic waveguide of the present invention.

Referring now to the drawings where similar parts are numbered the same,

FIG. 1 depicts a cross-sectional view of the optical waveguide 10 of the present invention. The optical waveguide 10 generally is any optical waveguide known to those skilled in the art. More specifically, the optical waveguide is a fiber optic waveguide (FIG. 1); a planar optic waveguide; and an integrated optic waveguide. Most preferably, the optical waveguide is a microstructured optical fiber. The planar optic and integrated optic waveguides are prepared from a porous silicon or a porous structure. By porous structure, it is meant to include porous polymers and sol gels. The microstructured optical fiber is defined as an optical fiber that comprises a (typically solid) core region surrounded by a cladding region that comprises a multiplicity of spaced apart cladding features that are elongate in the fiber axial direction and disposed in a first cladding material. The core region has an effective diameter and an effective refractive index. The cladding features have a refractive index that differs from the refractive index of the first cladding material and the cladding region has an effective refractive index that is less than the effective refractive index of the core. These fibers can be single mode fibers or multimode fibers. Such fibers and methods of fabrication are described in detail in U.S. Pat. No. 5,802,236 to DiGiovani et al., the specification of which is hereby incorporated by reference.

Figure 2:
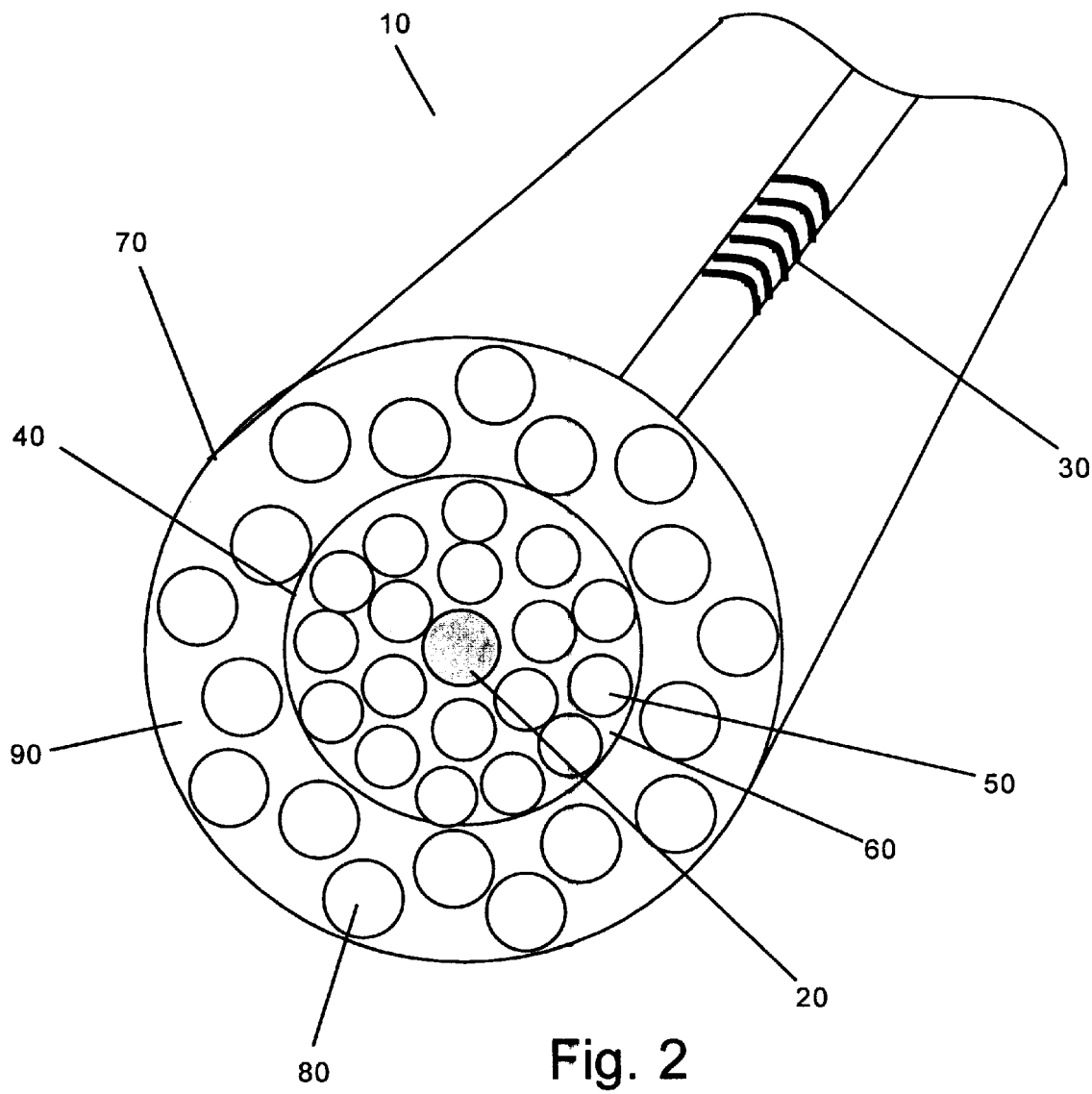
FIG. 2 is a cross-sectional view of the optical waveguide taken from along line I—I of FIG. 1.

Referring now to FIGS. 1 and 2, the optical waveguide 10 has a core 20, which may or may not be central in the waveguide. This core is typically made of a solid material, either homogeneous or a combination of materials (e.g. an inner germanosilicate core region and an outer $SiO_2$ core region). Disposed within the core 20 is at least one long period grating 30. For simplicity, only one long period grating is shown. Each long period grating 30 has a plurality of index perturbations of a given width, W, and is spaced apart by a periodic distance $\Lambda$. This periodic distance may or may not be regular. Spacing of the periodic distance is dependent upon the final application of the optical waveguide. In general, the periodic distance is $10\ \mu m \leq \Lambda \leq 1500\ \mu m$.

FIGS. 1 and 2 show an inner cladding region 40 surrounding the core 20. The inner cladding region 40 has a plurality of spaced apart first cladding features 50. Examples of various cladding features include but are not limited to voids, a reactive material, a polymer with a predetermined refractive index, a liquid crystal material, or F-doped silica. Preferably, the cladding features are voids. In an alternate embodiment, the first cladding features are voids that are filled with a material, and preferably the material is a reactive material. By reactive, it is meant that the material is capable of undergoing a change when exposed to a specific parameter such that the long period grating is caused to produce a wavelength transmission spectrum functionally dependent on the change that takes place. Conversely, the first cladding features may be voids that are filled with an inert material or a material that does not affect the wavelength transmission spectrum produced by the long period grating. In yet another embodiment, a combination of different cladding features may be used to form the first cladding region. For example, the first cladding features may be a combination of voids and voids that are filled with a material. The first cladding features 50 are typically disposed within a first cladding material 60. The first cladding material may or may not have the same composition as the core. The inner cladding region has an effective refractive index. This effective refractive index is dependent on the composition of the first cladding features and the first cladding material used to make-up the inner cladding region.

An outer cladding region 70 surrounds the inner cladding region 40. The outer cladding region 70 is comprised of a plurality of spaced apart second cladding features 80. As with the first cladding features, the second cladding features may be voids, a reactive material, a polymer with a predetermined refractive index, a liquid crystal material, or F-doped silica. Preferably, the cladding features are voids. In one embodiment, the second cladding features are voids that are filled with a reactive material. This material may or may not have the same composition as that which may be contained in the first cladding features. Alternatively, the voids may be filled with an inert material (which may or may not be the same as that in the first cladding features). The selection of the material filling the voids is dependent on the final application for the optical waveguide. For example, the voids in the inner cladding region may be filled with a reactive material that is the same as the reactive material filling the voids of the outer cladding region. In another embodiment, the inner cladding region voids may be filled with a reactive material and the outer cladding regions may be filled with an inert material or vice versa. Lastly, the voids in the inner cladding region and the outer cladding region may be filled with completely different materials.

The second cladding features 80 are disposed within a second cladding material 90. The second cladding material may or may not have the same composition as the core or the first cladding material. As an alternative embodiment, the outer cladding region may have a reactive coating disposed thereon. The outer cladding region has an effective refractive index that is dependent on the composition of the second cladding features and the second cladding material. The effective refractive index of the outer cladding region may be greater than or, alternatively, less than the effective refractive index of the inner cladding region. In another embodiment of the invention, the effective refractive index of the outer cladding region may be equal to the effective refractive index of the inner cladding region. This is determined by the final application for the optical waveguide.

The total effective refractive index of the cladding is the effective refractive index of the inner cladding region plus (and) the effective refractive index of the outer cladding region. The total effective refractive index of the combined cladding regions is approximately equal to but not greater than the effective refractive index of an environmental parameter to be sensed. In other words, the total of the effective refractive index of the inner cladding region plus the total effective refractive index of the outer cladding region is either approximately equal to and/or less than the effective refractive index of an environmental parameter to be sensed. Preferably, the total effective refractive index of the inner cladding region plus the outer cladding region ranges from about 1.1 (for liquid nitrogen applications) to about 3.0 (for titanium oxide or titanium particle applications). Most preferably, the total effective refractive index of the cladding is about 1.33 (which is suitable for biological applications).

Various combinations of cladding features will effect the total effective refractive index of the cladding for the sensor. For example, the inner cladding features may be voids where the outer cladding features may be of another composition and vice versa. Alternatively, the inner cladding features may be voids filled with a material (inert or reactive) while the outer cladding features may be of another composition and vice versa. In yet another embodiment, combinations of different cladding features may be used to form the first and second cladding regions. For example, the first cladding features may be a combination of voids and voids that are filled with a material and the second cladding features may be a combination of a polymer having a specific refractive index and voids. Such combinations and their advantages would be recognized by one skilled in the art.

Figure 3:
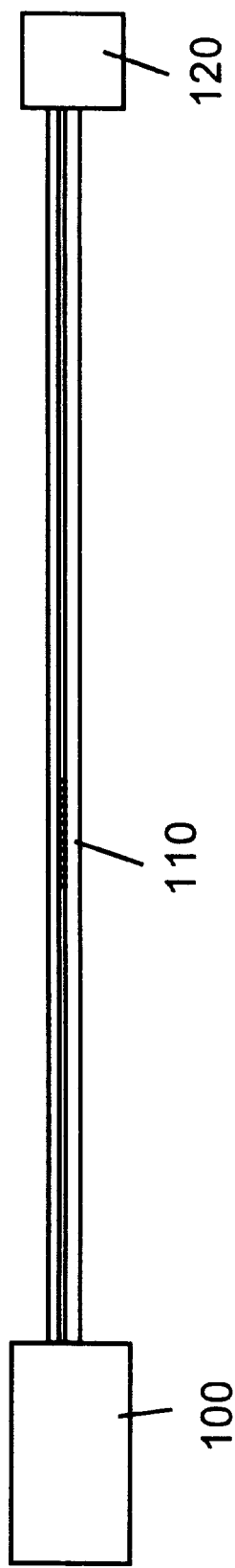
FIG. 3 is a schematic view of an optical waveguide sensor arrangement.

FIG. 3 depicts an optical waveguide arrangement employing the optical waveguide previously described. In this arrangement, a source means 100 is positioned in an operable relationship to the optical waveguide sensor 110 to provide light to the optical waveguide sensor 110. The source means 100 may be a broadband light source, a laser light source, or any other source of light known to those skilled in the art. An optoelectronic detector 120 is positioned in an operable relationship to the optical waveguide sensor 110. The optoelectronic detector 120 detects light that is transmitted through the optical waveguide sensor 110 and is capable of measuring power spectral density.

The optical waveguide arrangement may be used to measure changes in an environmental parameter. Examples of various environmental parameters include but are not limited to: a physical parameter; an electrical parameter; a chemical parameter; a biological parameter; and combinations thereof. In particular, examples of the physical parameter include pressure, temperature, strain or shape. Various electrical parameters include magnetic fields and conductive fields. Chemical parameters include chemically reactive sites where biological parameters include binding sites. In measuring these parameters, the optical waveguide sensor is provided and exposed to the environmental parameter. A change in the long period grating coupling conditions is measured. Because of the high sensitivity of the optical waveguide sensor, changes in the refractive index for systems having low refractive indices, such as those for biological systems, can now be accurately detected.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An optical waveguide sensor comprising:
   a core having at least one long period grating disposed therein wherein each long period grating has a plurality of index perturbations spaced apart by a periodic distance $\Lambda$, wherein the periodic distance is $10\ \mu m \leq \Lambda \leq 1500\ \mu m$;
   an inner cladding region surrounding the core and comprising a plurality of spaced apart first cladding features disposed within a first cladding material, wherein the inner cladding region has an effective refractive index;
   an outer cladding region surrounding the inner cladding region wherein the outer cladding region comprises a plurality of spaced apart second cladding features disposed within a second cladding material, wherein the outer cladding region has an effective refractive index; and
   wherein the total effective refractive index of the inner cladding region and the outer cladding region is approximately equal to but not greater than the effective refractive index of an environmental parameter to be sensed.

2. An optical waveguide sensor according to claim 1, wherein the effective refractive index of the outer cladding region is greater than the effective refractive index of the inner cladding region.

3. An optical waveguide sensor according to claim 1, wherein the effective refractive index of the outer cladding region is equal to the effective refractive index of the inner cladding region.

4. An optical waveguide sensor according to claim 1, wherein the total effective refractive index of the inner cladding region and the outer cladding region ranges from about 1.1 to about 3.0.

5. An optical waveguide sensor according to claim 4, wherein the total effective refractive index of the inner cladding region and the outer cladding region is about 1.33.

6. An optical waveguide sensor according to claim 1, wherein the first cladding features are voids.

7. An optical waveguide sensor according to claim 6, wherein the voids are filled with a material.

8. An optical waveguide sensor according to claim 7, wherein the material is a reactive material.

9. An optical waveguide sensor according to claim 6, wherein the second cladding features are voids.

10. An optical waveguide sensor according to claim 9, wherein the voids of the first cladding features are filled with a first material and wherein the voids of the second cladding features are filled with a second material.

11. An optical waveguide sensor according to claim 10, wherein the first material and the second material are the same and wherein the first material and the second material is a reactive material.

12. An optical waveguide sensor according to claim 10, wherein the first material is a reactive material.

13. An optical waveguide sensor according to claim 10, wherein the second material is a reactive material.

14. An optical waveguide sensor according to claim 1, wherein the second cladding features are voids.

15. An optical waveguide sensor according to claim 14, wherein the voids are filled with a material.

16. An optical waveguide sensor according to claim 15, wherein the material is a reactive material.

17. An optical waveguide sensor according to claim 1, wherein the first cladding features comprise a reactive material disposed within the first cladding material.

18. An optical waveguide sensor according to claim 1, wherein the first cladding features comprise an inert material disposed within the first cladding material.

19. An optical waveguide sensor according to claim 1, wherein the second cladding features comprise a reactive material disposed within the second cladding material.

20. An optical waveguide sensor according to claim 1, wherein the second cladding features comprise an inert material disposed within the second cladding material.

21. An optical waveguide sensor according to claim 1, wherein the outer cladding region has a reactive coating disposed thereon.

22. An optical waveguide sensor according to claim 1, further comprising a source means for providing light to the optical waveguide sensor; and an optoelectronic detector positioned in an operable relationship to the optical waveguide sensor wherein the optoelectronic detector detects light transmitted through the optical waveguide sensor.

23. An optical waveguide sensor according to claim 1, wherein the optical waveguide is a microstructured optical fiber.

24. An optical waveguide sensor according to claim 23, wherein the total effective refractive index of the inner cladding region and the outer cladding region ranges from about 1.1 to about 3.0.

25. An optical waveguide sensor according to claim 24, wherein the total effective refractive index of the inner cladding region and the outer cladding region is about 1.33.

26. An optical waveguide sensor according to claim 23, wherein the first cladding features are voids.

27. An optical waveguide sensor according to claim 26, wherein the voids are filled with a material.

28. An optical waveguide sensor according to claim 27, wherein the material is a reactive material.

29. An optical waveguide sensor according to claim 26, wherein the second cladding features are voids.

30. An optical waveguide sensor according to claim 29, wherein the voids of the first cladding features are filled with a first material and wherein the voids of the second cladding features are filled with a second material.

31. An optical waveguide sensor according to claim 30, wherein the first material and the second material are the same and wherein the first material and the second material is a reactive material.

32. An optical waveguide sensor according to claim 31, wherein the first material is a reactive material.

33. An optical waveguide sensor according to claim 30, wherein the second material is a reactive material.

34. An optical waveguide sensor according to claim 23, wherein the first cladding features comprise a reactive material disposed within the first cladding material.

35. An optical waveguide sensor according to claim 23, wherein the first cladding features comprise an inert material disposed within the first cladding material.

36. An optical waveguide sensor according to claim 23, wherein the second cladding features comprise a reactive material disposed within the second cladding material.

37. An optical waveguide sensor according to claim 23, wherein the second cladding features comprise an inert material disposed within the second cladding material.

38. An optical waveguide sensor according to claim 23, wherein the outer cladding region has a reactive coating disposed thereon.

39. An optical waveguide sensor according to claim 23, further comprising a source means for providing light to the optical waveguide sensor; and an optoelectronic detector positioned in an operable relationship to the optical waveguide sensor wherein the optoelectronic detector detects light transmitted through the optical waveguide sensor.

40. A process for measuring changes in an environmental parameter, the process comprising the steps of:

a) providing an optical waveguide sensor comprising:

a core having at least one long period grating disposed therein wherein each long period grating has a plurality of index perturbations spaced apart by a periodic distance $\Lambda$, wherein the periodic distance is 10 $\mu m \leq \Lambda \leq 1500\ \mu m$;

an inner cladding region surrounding the core and comprising a plurality of spaced apart first cladding features disposed within a first cladding material, wherein the inner cladding region has an effective refractive index;

an outer cladding region surrounding the inner cladding region wherein the outer cladding region comprises a plurality of spaced apart second cladding features disposed within a second cladding material, wherein the outer cladding region has an effective refractive index; and wherein the total effective refractive index of the inner cladding region and the outer cladding region is approximately equal to but not greater than the effective refractive index of an environmental parameter to be sensed;

b) exposing the optical waveguide sensor to the environmental parameter; and c) measuring a change in the long period grating coupling conditions.

41. A process according to claim 40, wherein the environmental parameter comprises: a physical parameter; an electrical parameter; a chemical parameter; or a biological parameter.

42. A process according to claim 41, wherein the physical parameter is pressure, temperature, strain or shape.

43. A process according to claim 41, wherein the electrical parameter is a magnetic field or conductive field.

44. A process according to claim 41, wherein the chemical parameter is a chemically reactive site.

45. A process according to claim 41, wherein the biological parameter is a binding site.

* * * * *